United States Patent
Maki

(10) Patent No.: US 8,542,414 B2
(45) Date of Patent: Sep. 24, 2013

(54) IMAGE READING APPARATUS

(75) Inventor: Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 13/020,840

(22) Filed: Feb. 4, 2011

(65) Prior Publication Data

US 2011/0194160 A1   Aug. 11, 2011

(30) Foreign Application Priority Data

Feb. 5, 2010   (JP) .................................. 2010-024058

(51) Int. Cl.
- *H04N 1/04*   (2006.01)
- *H04N 1/40*   (2006.01)
- *G06F 3/12*   (2006.01)
- *G01N 21/86*   (2006.01)
- *G03G 15/00*   (2006.01)
- *G09G 3/36*   (2006.01)

(52) U.S. Cl.
USPC .......... 358/488; 358/474; 358/498; 358/1.13; 358/449; 250/559.15; 399/16; 399/367; 345/103

(58) Field of Classification Search
USPC .......... 358/488, 498, 1.13, 474; 250/559.15; 399/16; 345/103
See application file for complete search history.

(56) References Cited

U.S. PATENT DOCUMENTS

| | | | | |
|---|---|---|---|---|
| 5,198,853 | A * | 3/1993 | Ichihara et al. | 399/16 |
| 5,969,371 | A * | 10/1999 | Andersen et al. | 250/559.15 |
| 2002/0196226 | A1 * | 12/2002 | Tegreene et al. | 345/103 |
| 2004/0070798 | A1 * | 4/2004 | Andersen et al. | 358/498 |
| 2006/0007506 | A1 * | 1/2006 | Chen | 358/474 |
| 2006/0181745 | A1 * | 8/2006 | Kyuken et al. | 358/498 |
| 2009/0073480 | A1 * | 3/2009 | Yanagawase | 358/1.13 |
| 2009/0185237 | A1 | 7/2009 | Tanaka | |
| 2011/0176186 | A1 * | 7/2011 | Kanaya et al. | 358/498 |

FOREIGN PATENT DOCUMENTS

| | | |
|---|---|---|
| CN | 101494706 A | 7/2009 |
| JP | 2005-57483 A | 3/2005 |

* cited by examiner

Primary Examiner — Charlotte M Baker
Assistant Examiner — Rury Grisham
(74) Attorney, Agent, or Firm — Nutter McClennen & Fish LLP; John J. Penny, Jr.; Christina M. Sperry

(57) ABSTRACT

A position of a leading edge of an original sheet should be accurately detected utilizing a shadow thereof, irrespective of thickness of the original sheet. In a scanner, an image sensor recognizes the shadow of the leading edge of the original sheet projected on a projection screen when a light source emits light to the original sheet being automatically transported on a glass plate. The original sheet is determined to have reached a reading position, when the original sheet is further transported by a predetermined distance after the shadow is recognized. The projection screen is located above the glass plate at a position spaced apart from the image sensor by a predetermined distance, and hence the timing that the shadow of the leading edge of the original sheet is projected on the projection screen is constant irrespective of the thickness of the original sheet.

5 Claims, 8 Drawing Sheets

IMAGE READING APPARATUS

BACKGROUND

1. Technical Field

The present invention relates to an image reading apparatus.

2. Related Art

Image reading apparatuses developed to date include those incorporated with an automatic document feeder (hereinafter, ADF) that feeds sheets of an original one by one from a bundle of sheets of the original stacked on a tray, to a predetermined reading position. In the image reading apparatus with the ADF, when a paper edge detection sensor located upstream of the reading position detects a leading edge of the original sheet, a paper feed roller is rotated by an amount corresponding to the distance between the detection position and the reading position, before reading is started. Specifically, the paper edge detection sensor is located several centimeters upstream of the reading position, because of structural restriction of the image reading apparatus. Accordingly, in case that the original sheet is bent or slips on its way from the detection position to the reading position, the leading edge of the original sheet may have actually failed to reach the reading position, despite it being assumed that the leading edge of the original sheet has reached the reading position, from the viewpoint of operation control. To minimize such a drawback, for example an image reading apparatus according to JP-A-2005-57483 is configured to detect the leading edge of the original sheet immediately before the reading position, utilizing a light source and a photodetector employed for reading an image. More specifically, the image reading apparatus is configured, as shown in FIG. 8, such that the original sheet is transported onto a white reference roller 210, and that light from the light source 212 is obliquely emitted from behind to the original sheet being transported. At the moment that the leading edge of the original sheet reaches the position immediately before the reading position, the shadow of the leading edge is projected on the white reference roller 210, and detected by the photodetector 214. Then the original sheet is transported by a predetermined distance from the position where the shadow has been detected, so that the leading edge of the original sheet is led to the reading position.

In the foregoing image reading apparatus, however, the position of the leading edge of the original sheet at the time that the shadow is detected varies depending on the thickness of the original sheet. As is apparent from FIG. 8, the position of the leading edge of the original sheet at the time that the shadow is detected is different between the original sheet of a predetermined thickness (solid lines) and another original sheet thicker than the predetermined thickness (dash-dot lines). This leads to a drawback that using an original sheet having a different thickness degrades the accuracy in detecting the position of the leading edge of the original sheet utilizing the shadow of the leading edge.

SUMMARY

An advantage of some aspects of the invention is that an image reading apparatus is provided that can accurately detect a position of a leading edge of an original utilizing the shadow thereof, irrespective of the thickness of the original.

According to an aspect of the invention, an image reading apparatus is provided that reads an image on an original, including a transparent plate on which the original is automatically transported, a light emitter disposed under the transparent plate that emits light to the original from behind with respect to a transport direction thereof, and a photodetector that receives reflection of the light. The image reading apparatus also includes a projection plane fixed above the transparent plate at a position spaced apart from the photodetector by a predetermined distance, and a sensing unit that recognizes through the photodetector a shadow of a leading edge of the original projected on the projection plane, when the leading edge of the original being automatically transported on the transparent plate is illuminated with the light from the light emitter.

In the image reading apparatus thus configured, the sensing unit recognizes, through the photodetector, the shadow of the leading edge of the original projected on the projection plane, when the leading edge of the original being automatically transported on the transparent plate is illuminated with the light from the light emitter. Here, the projection plane is fixed above the transparent plate at a position spaced apart from the photodetector by a predetermined distance, and hence the timing that the shadow of the leading edge of the original is projected on the projection plane is constant irrespective of the thickness of the original. Therefore, the image reading apparatus is capable of accurately recognizing the position of the leading edge of the original utilizing the shadow thereof, irrespective of the thickness of the original.

It is to be noted that the expressions "above the transparent plate" and "under the transparent plate" are employed merely for convenience sake, and actually designate one side and the other of a space divided by the transparent plate.

In the foregoing image reading apparatus, it is preferable that the projection plane is white. In this case a boundary between a white region on the projection plane and a dark region (gray to black) corresponding to the shadow is clearly defined, which makes it easier to recognize the shadow of the leading edge of the original, projected on the projection plane.

In another aspect of the invention, the image reading apparatus may include a transparent original presser that presses the original being automatically transported on the transparent plate, located between the projection plane and the transparent plate. Such a structure allows, since the original presser is transparent, the shadow of the leading edge of the original to appear on the projection plane even in the case where the original is pressed by the original presser during the reading operation. Also, since the projection plane is spaced apart from the transparent plate at least by a distance corresponding to the thickness of the original presser, the shadow is projected on the projection plane in a sufficiently large size, which further facilitates the shadow to be recognized.

In the image reading apparatus including the original presser, the original presser may be a transparent member that includes a curved portion having a generally semicircular cross section, for pressing the original with such a curved portion. Here, the expression "generally semicircular" includes a semielliptical and a semioval shape, in addition to the semicircular shape. Alternatively, the original presser may be a transparent roller, and the projection plane may be an axle of the roller.

In still another aspect of the invention, the image reading apparatus may include an original position determination unit that determines that the original has reached the reading position, when the original is automatically transported by a predetermined distance after the shadow of the leading edge of the original is recognized by the sensing unit. Such a structure enables accurate detection as to whether the original has reached the reading position, utilizing the shadow of the leading edge of the original.

In still another aspect of the invention, the photodetector may be constituted of a plurality of light receiving elements aligned in a direction intersecting with the transport direction of the original. In this case, the image reading apparatus may include an original tilt determination unit that determines whether the original is tilted, on the basis of whether the light receiving elements of the photodetector have detected the shadow of the leading edge of the original at different timings. Such arrangement enables accurate determination as to whether the original is tilted, utilizing the shadow of the leading edge of the original. Further, in the case where the light receiving elements have detected the shadow of the leading edge of the original at different timings, a skew angle (tilt angle) of the original may be calculated according to the difference in timing. It may further be determined whether the skew angle is within a permissible range, to thereby execute the image reading in the affirmative case, or to cancel the image reading in the negative case. In the affirmative case, the acquired image data may be corrected so as to offset the skew angle.

With the image reading apparatus configured as above, locating the photodetector and the projection plane farther from each other can make the shadow larger, and hence it becomes easier for the photodetector to detect the shadow of the leading edge of the original. However, in the case where the photodetector and the projection plane are very far from each other, the boundary between the shadow and an unshadowed region blurs. Accordingly, it is preferable to determine in advance through experiments a distance range that allows the shadow to be accurately detected, to thereby set the distance between the photodetector and the projection plane as long as possible within that distance range.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
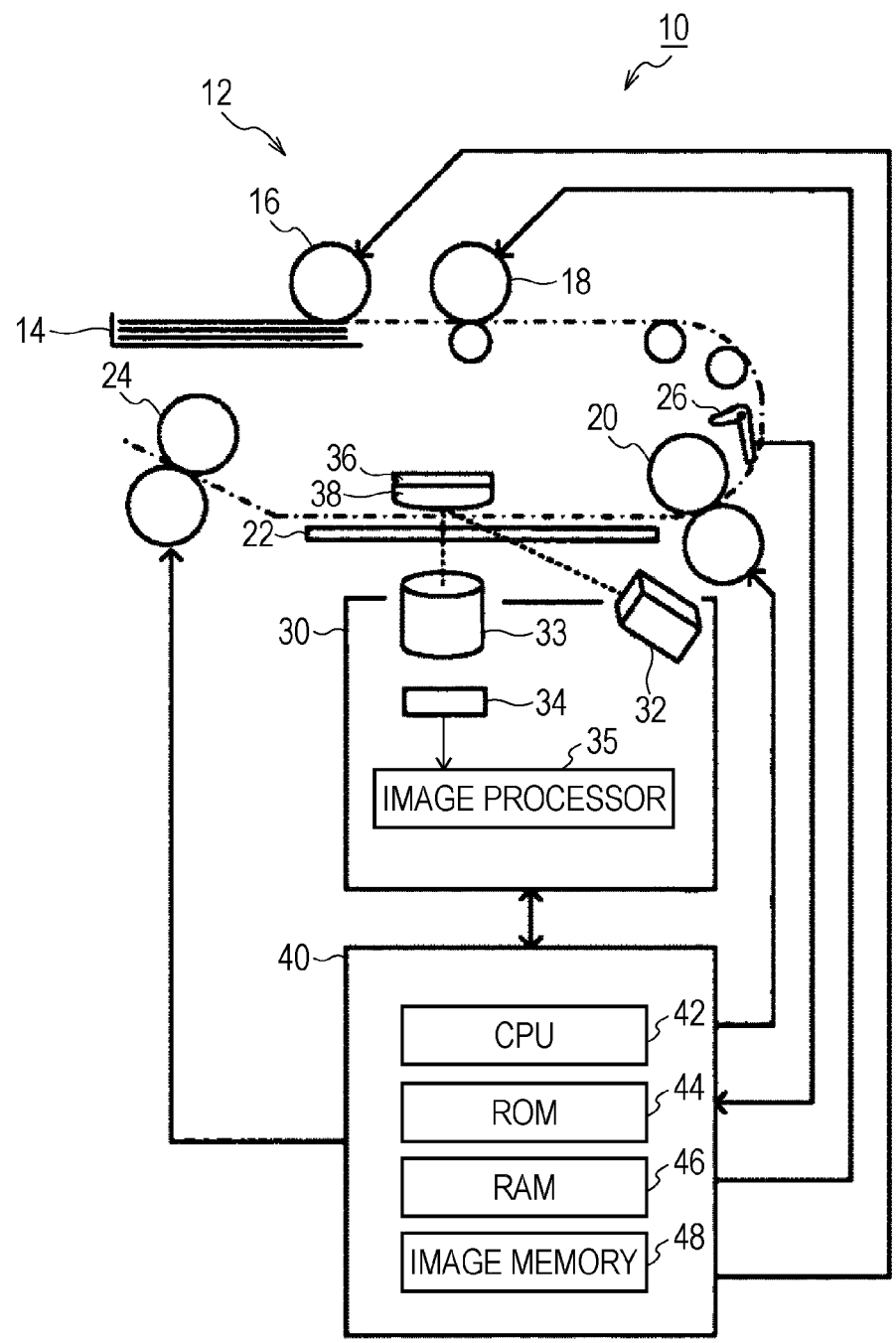
FIG. 1 is a schematic diagram showing a general configuration of a scanner.

Hereafter, embodiments of the invention will be described referring to the drawings. FIG. 1 is a schematic diagram showing a general configuration of a scanner 10, exemplifying the image reading apparatus according to the invention.

The scanner 10 according to this embodiment includes, as shown in FIG. 1, an ADF 12 that automatically feeds a sheet of an original, an image acquisition unit 30 that acquires an image on the original sheet, a projection screen 36 on which a shadow of the original sheet is to be projected, and a controller 40 that executes controlling operations. Dash-dot lines in FIG. 1 indicate a route on which the original sheet is automatically transported.

The ADF 12 is a known mechanism that takes out a sheet of original sheet with a pickup roller 16 and a separation roller 18, from a bundle of original sheets stacked on a paper feed tray 14; automatically transports the original sheet with a paper feed roller 20 to a position on a transparent glass plate 22 opposing an image sensor 34 of the image acquisition unit 30 (reading position); and delivers the original sheet to a delivery tray (not shown) with a delivery roller 24. At a position upstream of the paper feed roller 20, a contact type paper edge detection sensor 26 is located that outputs an ON signal when the original sheet is passing thereover and otherwise outputs an OFF signal. The paper edge detection sensor 26 is an L-shaped member supported by a shaft located at a generally central portion thereof so as to swing about the shaft, and assumes different postures depending on whether the paper edge detection sensor 26 is in contact with the original sheet.

In the image acquisition unit 30, the image sensor 34 receives reflected light, the light having been emitted by a light source 32 provided under the glass plate 22 to the original sheet being transported on the glass plate 22, from behind with respect to the transport direction, and an image processor 35 converts an analog signal generated by the image sensor 34 into a digital signal and outputs the digital signal to the controller 40. The light source 32 includes a plurality of white LEDs aligned in a direction (main scanning direction) orthogonal to the transport direction of the original sheet, so that a light beam from the respective LEDs is linearly emitted to the original sheet. The image sensor 34 includes a plurality of image pickup elements aligned in the main scanning direction, and converts the received light into an electric charge and outputs an analog signal. The image sensor 34 includes a lens 33 so as to focus light on the lower surface of the original sheet passing on the glass plate 22. The image sensor 34 may be constituted of a CCD image sensor that outputs data of three primary colors (RGB), or a CMOS type image sensor.

The projection screen 36 is fixed above the glass plate 22, at a position spaced apart from the image sensor 34 by a predetermined distance. The projection screen 36 has a white surface. Between the projection screen 36 and the glass plate 22, a transparent platen 38 is disposed that presses the original sheet automatically transported on the glass plate 22. The platen 38 includes an elastically deformable curved portion having a generally semicircular cross section, and serves to press the original sheet on the glass plate 22 with such a curved portion. The projection screen 36 is attached to an upper face of the platen 38. The platen 38 and the glass plate 22 are disposed so as to define a gap therebetween that is slightly narrower than a minimum thickness of the original sheet applicable to the image reading apparatus.

The controller 40 is set up as a microprocessor essentially including a CPU 42, and also includes a ROM 44 containing processing programs (image reading routine to be subsequently described and the like) and various data and tables, a RAM 46 that temporarily stores the data, and an image memory 48 that stores image data inputted from the image acquisition unit 30. The controller 40 receives the signals from the image acquisition unit 30, and the ON/OFF signals from the paper edge detection sensor 26. The controller 40 also outputs a drive signal to the rollers 16, 18, 20, and 24 of the ADF 12, and control signals to the image acquisition unit 30.

Figure 2:
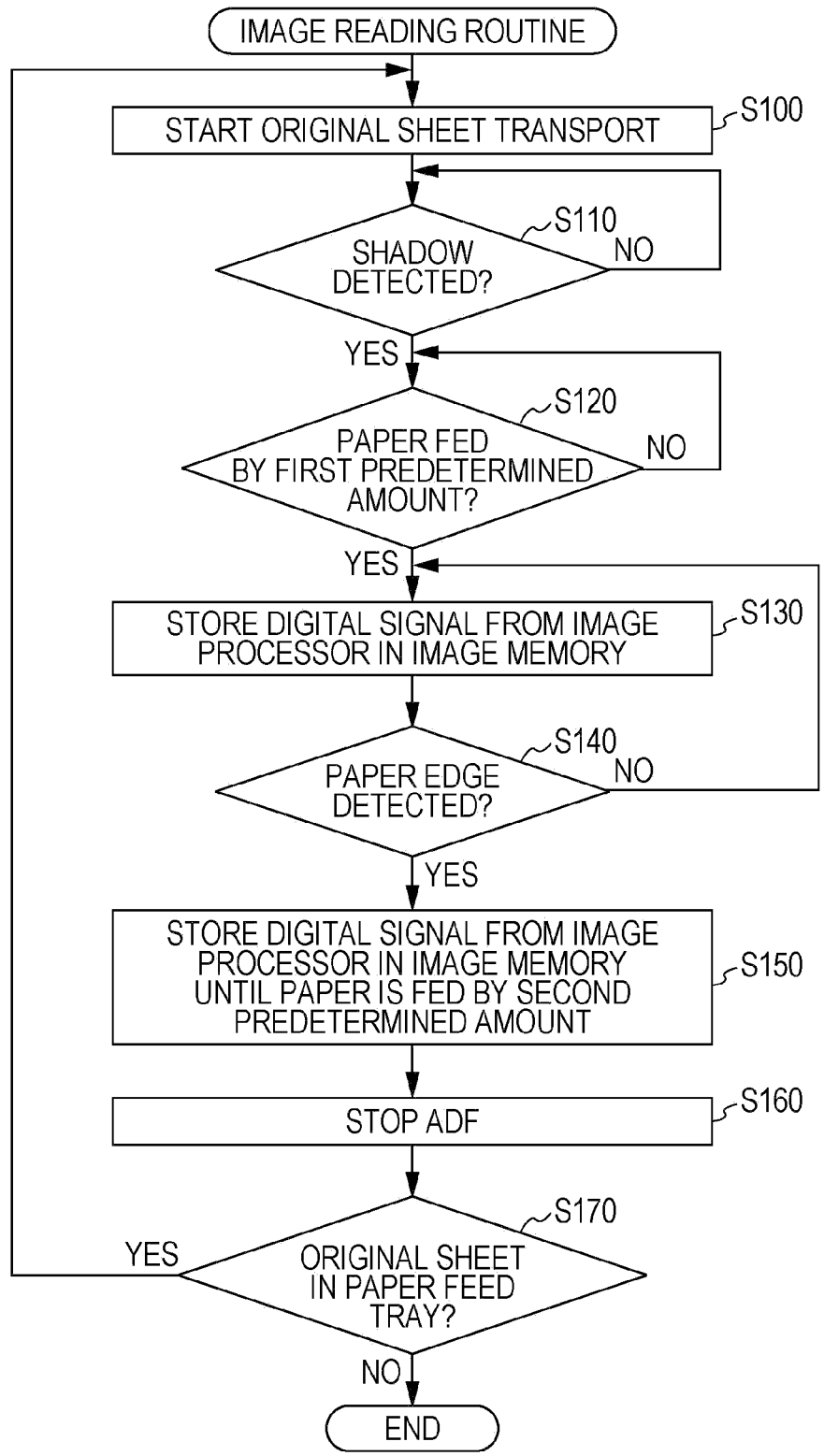
FIG. 2 is a flowchart showing an image reading routine.
Figure 3:
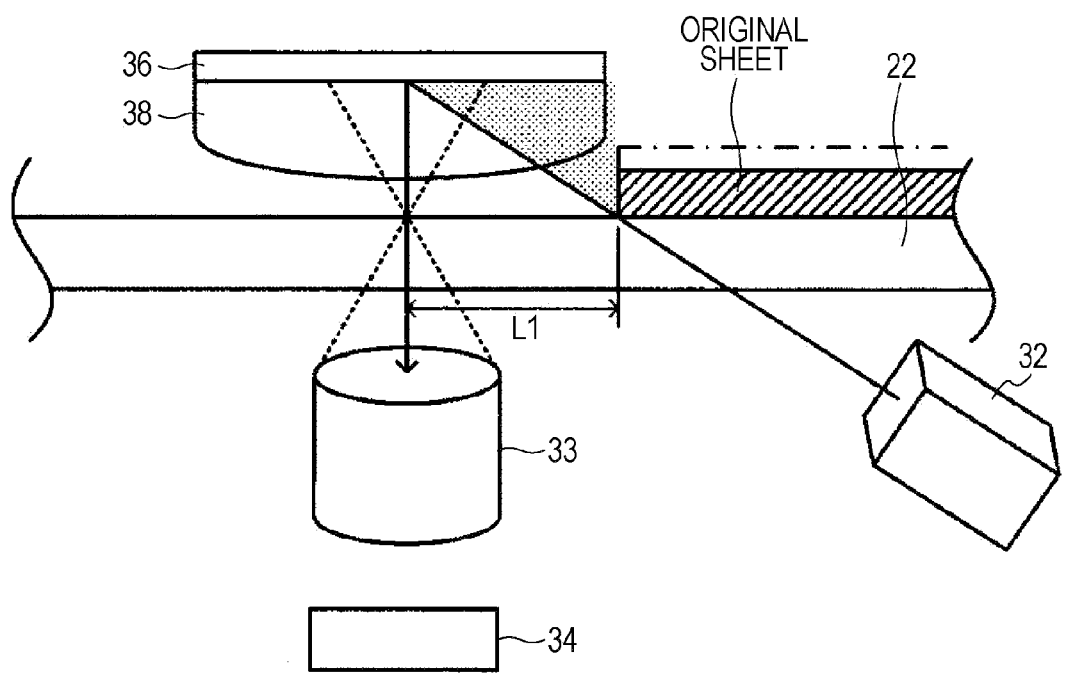
FIG. 3 is an enlarged diagram showing the vicinity of an image acquisition unit.

An operation of the scanner 10 thus configured according to this embodiment will now be described hereunder. FIG. 2 is a flowchart of the image reading routine executed by the CPU 42 of the controller 40, and FIG. 3 is an enlarged diagram showing the vicinity of the image acquisition unit 30. The image reading routine is stored in the ROM 44, to be executed when the original sheet is present on the paper feed tray 14 and a start button (not shown) is turned on by an operator. Here, whether the original sheet is present on the paper feed tray 14 can be determined according to a signal from an original sheet sensor (not shown) attached to the paper feed tray 14.

With the startup of the image reading routine shown in FIG. 2, the CPU 42 first starts transporting the original sheet (step S100). More specifically, the CPU 42 rotationally drives the pickup roller 16 and the separation roller 18 to thereby pick up an original sheet out of a bundle of the original sheets stacked on the paper feed tray 14, and then rotationally drives the paper feed roller 20 to thereby transport the original sheet along the dash-dot lines in FIG. 1. The rotation of the pickup roller 16 is stopped at the time that a sheet of original sheet is drawn out from the paper feed tray 14.

Figure 4:
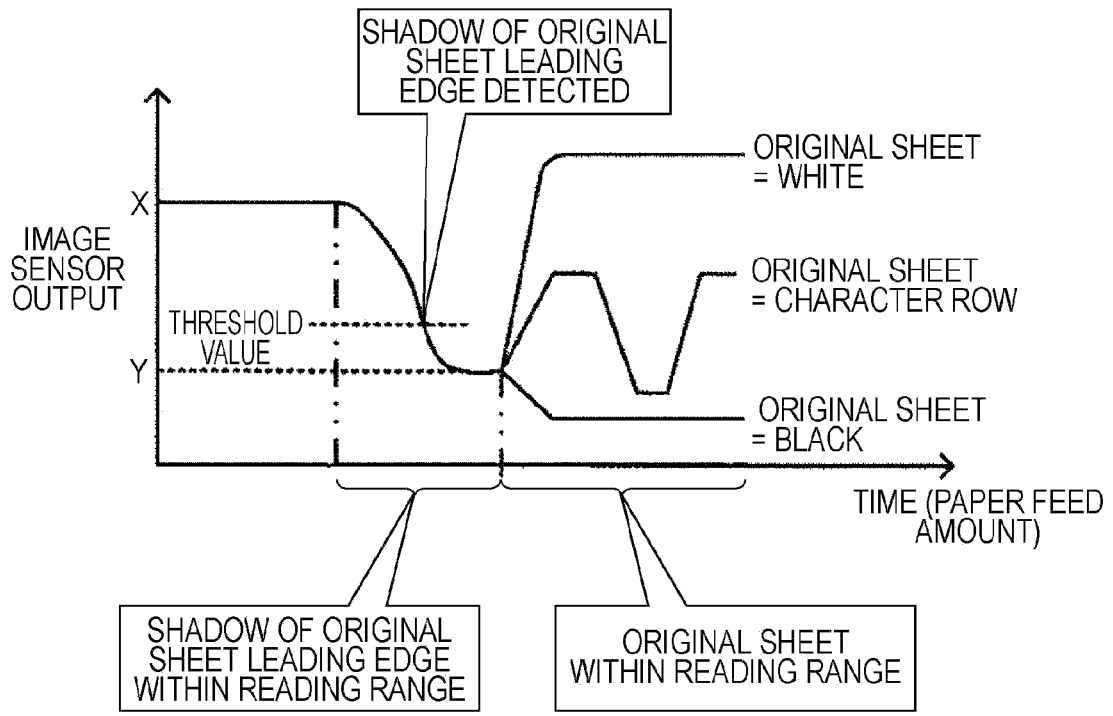
FIG. 4 is a graph showing a relationship between time (paper feed amount) and a sensor output.

The CPU 42 then determines whether the image sensor 34 of the image acquisition unit 30 has detected a shadow of the leading edge of the original sheet being transported (step S110). The original sheet being transported moves on the glass plate 22 past the paper feed roller 20, during which a shadowed region is created, shown as a hatched portion in FIG. 3, when the leading edge of the original sheet interferes with the light from the light source 32. The shadow of the leading edge of the original sheet thus created is projected as is on the projection screen 36, since the platen 38 is transparent. The light reflected by the projection screen 36 is detected by the image sensor 34, and an analog signal thereby generated is converted into a digital signal by the image processor 35 and inputted to the controller 40. Accordingly, the CPU 42 determines whether the image sensor 34 has detected the shadow of the leading edge of the original sheet being transported, according to whether the digital signal inputted from the image processor 35 has been changed from white to a dark color (gray to black) representing the shadow. FIG. 4 is a graph showing a relationship between time (paper feed amount) and a sensor output. As shown therein, the output of the image sensor 34, which is substantially the same as the digital signal from the image processor 35, is maintained at a relatively constant value X before the shadow of the leading edge of the original sheet reaches the reading position (reading range) of the image sensor 34, because in this stage the light reflected by the white region on the projection screen 36 is inputted. When the shadow of the leading edge of the original sheet enters the reading range with the lapse of time, the output gradually declines as the shadowed region spreads in the reading range, and eventually falls to a value Y. Accordingly, it is preferable to set a certain threshold value between the values X and Y, and to determine that the shadow of the leading edge of the original sheet has been detected when the output falls below the threshold value. It is to be noted that when the original sheet is further transported and a content thereof enters the reading range, the output markedly fluctuates depending on the color on the original sheet. For example, where the original sheet is blank the output becomes higher, and where letters are written on the original sheet the output frequently fluctuates because a white portion and a black portion alternately appear. In the case where the original sheet is black, the output becomes lower.

In the case where it is determined that the image sensor 34 has not detected the shadow of the leading edge of the original sheet, the CPU 42 waits for the original sheet to be further transported. Accordingly, the original sheet continues to move toward the reading position. On the other hand, in the case where it is determined that the image sensor 34 has detected the shadow of the leading edge of the original sheet being transported, the CPU 42 determines whether the original sheet has been moved forward by a first predetermined distance from that moment (step S120). Here, the first predetermined distance corresponds to a distance L1 between the position where the image sensor 34 has detected the shadow and the reading position of the image sensor 34 (see FIG. 3). Therefore, whether the original sheet has been moved forward by the first predetermined distance may be determined, for example, according to whether a time calculated by dividing the distance L1 by a transport speed v of the original sheet has elapsed or, in the case where a step motor is employed for driving the paper feed roller 20, according to whether the step motor has rotated by the number of steps corresponding to the distance L1.

In the case where the original sheet has not been moved forward by the first predetermined distance from the position after the image sensor 34 has detected the shadow, the CPU 42 waits for the original sheet to be further transported. Accordingly, the original sheet continues to move toward the reading position. On the other hand, in the case where it is determined that the original sheet has been moved forward by the first predetermined distance from the position after the image sensor 34 has detected the shadow, the CPU 42 assumes that the leading edge of the original sheet has reached the reading position, and stores the digital signal inputted from the image processor 35 in the image memory 48 (step S130). Then it is determined whether the paper edge detection sensor 26 has detected a lagging edge of the original sheet (step S140), and in the negative case the process returns to the step S130. On the contrary, in the affirmative case, the CPU 42 continues to store the digital signal inputted from the image processor 35 in the image memory 48, from that moment until the original sheet has been moved forward by a second predetermined distance (step S150). Here, the second predetermined distance corresponds to a distance along the transport route of the original sheet between the position where the paper edge detection sensor 26 is located and the reading position of the image sensor 34. After completion of the step S150, the CPU 42 stops driving the ADF 12 (step S160), and determines whether a next original sheet is present on the paper feed tray 14 (step S170). In the affirmative case the process returns to the step S100, and in the negative case the image reading routine is finished.

In the scanner 10, locating the image sensor 34 farther from the projection screen 36 makes the shadow larger, and hence makes it easier to detect the shadow of the leading edge of the original sheet. However, in the case where the image sensor 34 and the projection screen 36 are very far from each other, the boundary between the shadow and an unshadowed region blurs. In this embodiment, accordingly, a distance range that allows the shadow to be accurately detected is determined in advance through experiments, and the thickness of the platen 38, as well as the distance between the image sensor 34 and the projection screen 36, is determined at an upper limit of that distance range.

Here, correspondence between the constituents according to this embodiment and those of the invention is as follows. The scanner 10 according to this embodiment corresponds to the image reading apparatus, the light source 32 corresponds to the light emitter, the image sensor 34 corresponds to the photodetector, the projection screen 36 corresponds to the projection plane, and the controller 40 corresponds to the sensing unit. Further, the platen 38 corresponds to the original presser, and the controller 40 also to the original position determination unit.

In the scanner 10 thus configured, the projection screen 36 is fixed above the glass plate 22 at a position spaced apart from the image sensor 34 by a predetermined distance, and hence the timing at which the shadow of the leading edge of the original sheet is projected on the projection screen 36 is constant irrespective of the thickness of the original sheet. Therefore, the scanner 10 is capable of accurately recognizing the position of the leading edge of the original sheet utilizing the shadow thereof, irrespective of the thickness of the original sheet.

Also, since the projection screen 36 is white, a boundary between a region on the projection screen 36 shadowed by the leading edge of the original sheet (dark color) and an unshadowed region (white) is clearly defined. Accordingly, it becomes easier to recognize the shadow of the leading edge of the original sheet, projected on the projection screen 36, resulting in higher determination accuracy as to whether the shadow has been detected.

Further, the shadow of the leading edge of the original sheet is projected as is on the projection screen 36, since the platen 38 is transparent. The projection screen 36 is spaced apart from the glass plate 22 at least by a distance corresponding to the thickness of the platen 38, and therefore the shadow is projected on the projection screen 36 in a sufficiently large size, which further facilitates the shadow to be recognized.

Further, the CPU 42 determines that the original sheet has reached the reading position when the original sheet is automatically transported by the first predetermined distance after the shadow of the leading edge of the original sheet is recognized. Such arrangement further improves the accuracy in determining whether the original sheet has reached the reading position, utilizing the shadow of the leading edge of the original sheet.

It is a matter of course that the invention is in no way limited to the foregoing embodiment, but may be modified within the technical scope of the invention.

Figure 5:
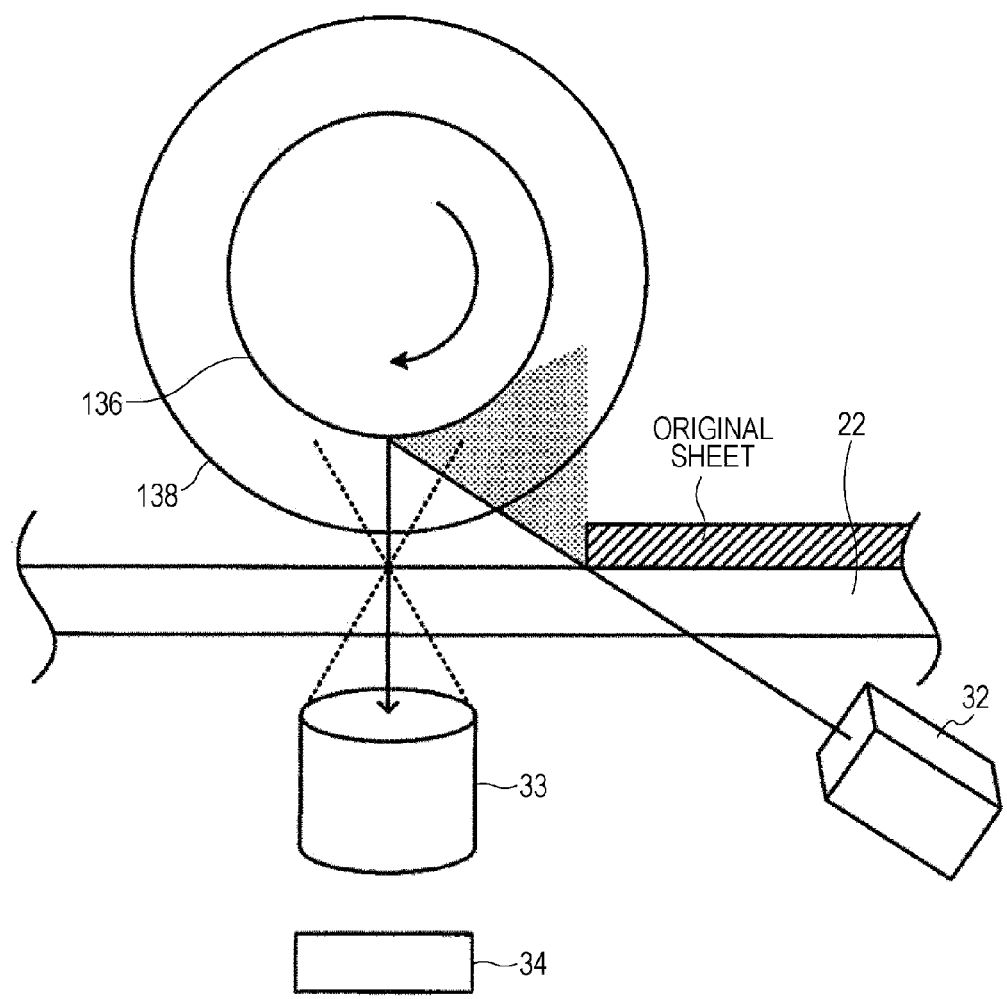
FIG. 5 is an enlarged diagram showing the vicinity of a modified image acquisition unit.

To cite a few examples, the platen 38 according to the foregoing embodiment is a transparent member that includes a curved portion having a generally semicircular cross section for pressing the original sheet with the curved portion. However, as shown in FIG. 5, a transparent and elastically deformable roller may be employed as a platen 138, and a white axle of the roller may be employed as a projection plane 136. In this case, the shadow of the leading edge of the original sheet is projected on the projection plane 136 which is an outer circumferential surface of a cylindrical member, which still provides the same advantages as those described with reference to the embodiment.

Figure 6:
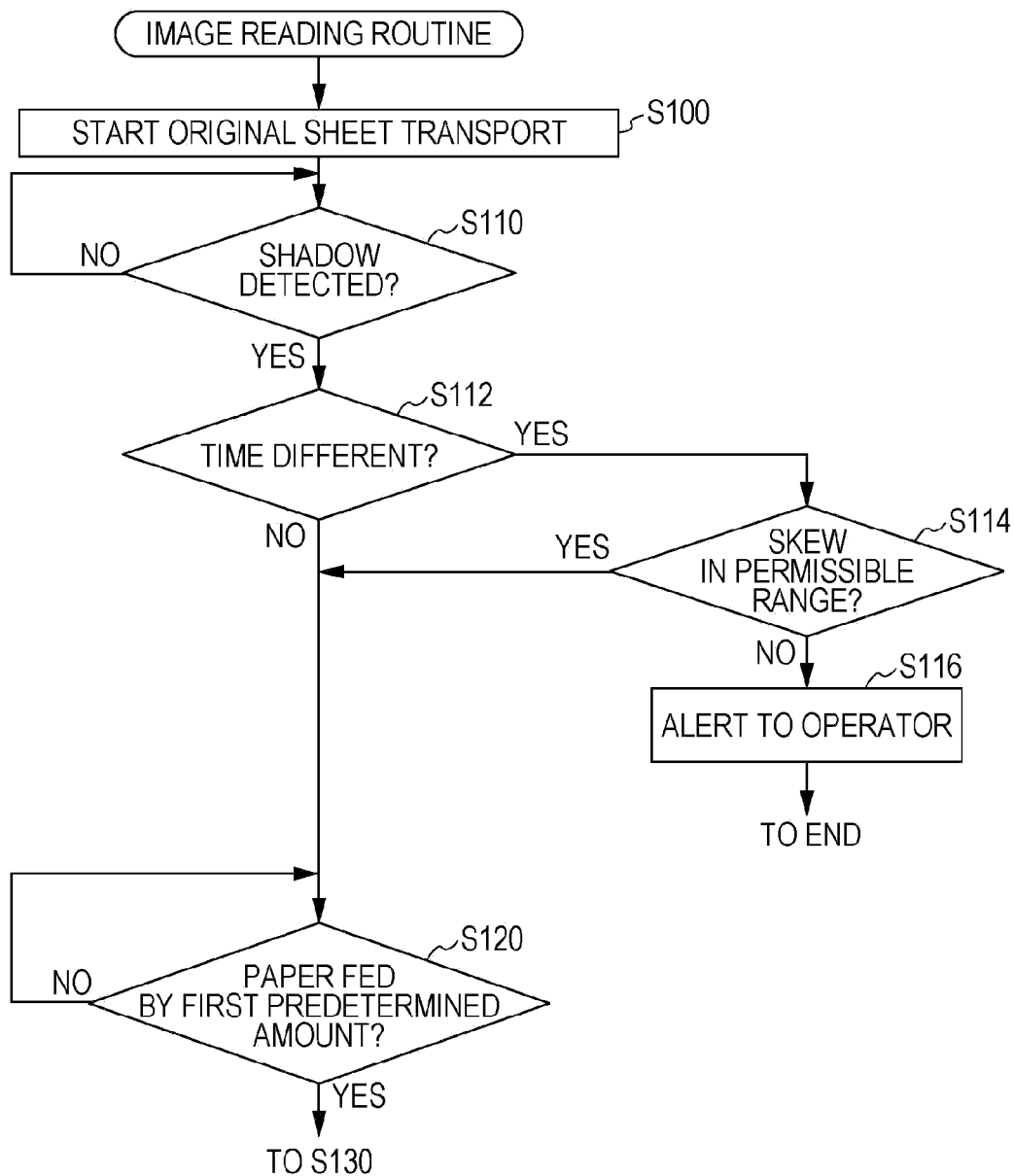
FIG. 6 is a flowchart showing a modified image reading routine.
Figure 7A:
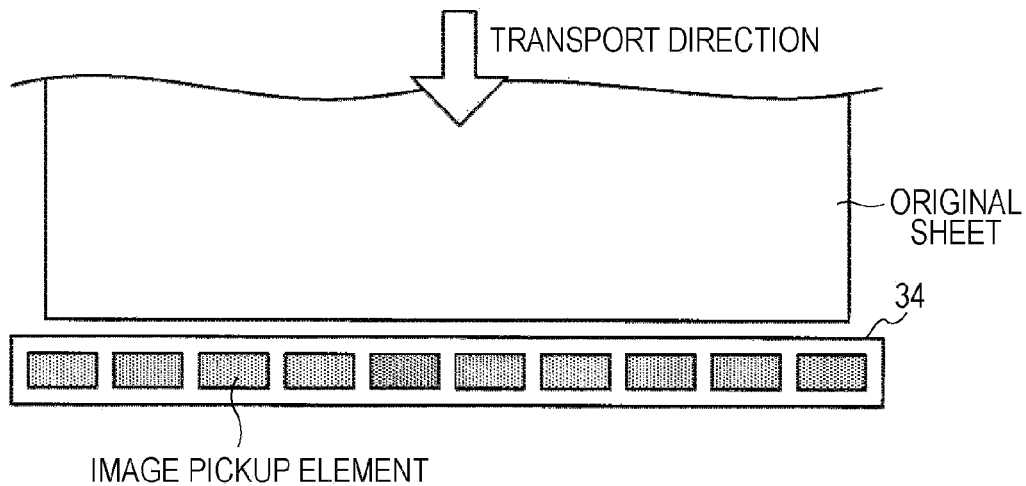
FIGS. 7A and 7B are plan views for explaining a skew angle.
Figure 7B:
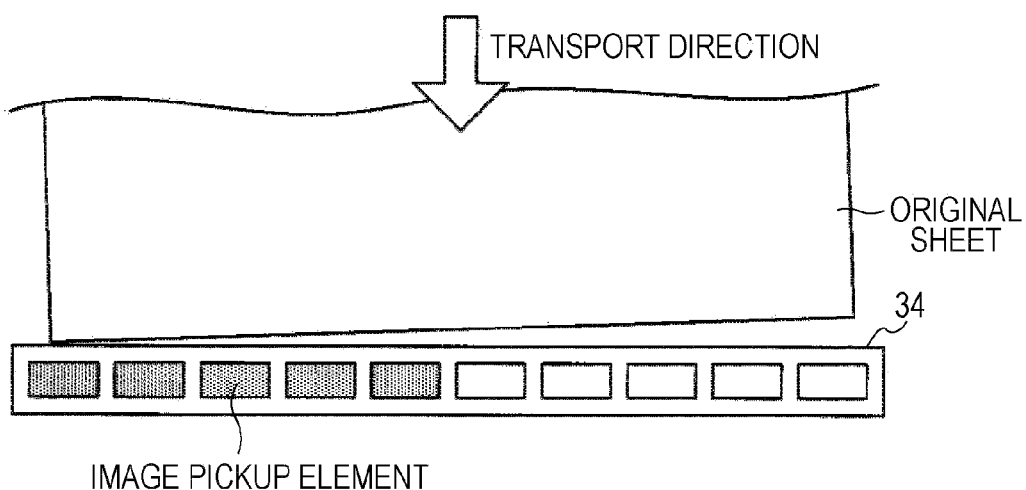
Figure 8:
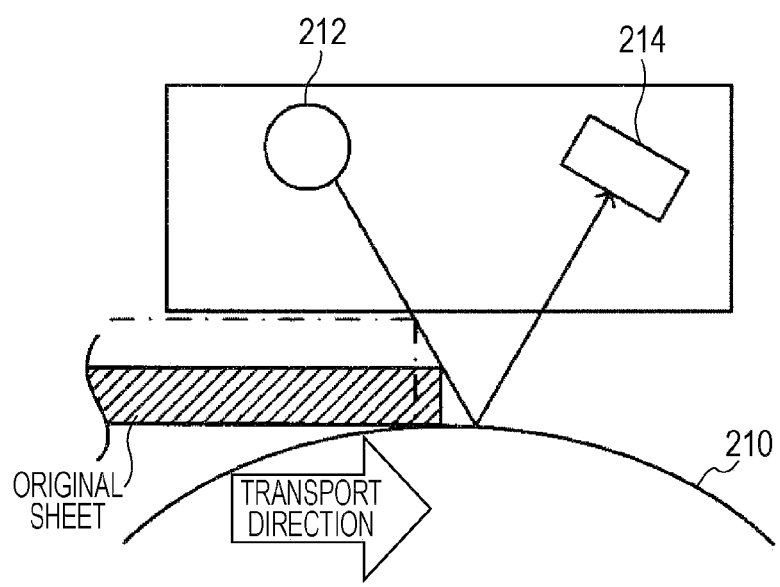
FIG. 8 is a schematic diagram for explaining the related art.

The image reading routine according to the foregoing embodiment may be modified as shown in FIG. 6. According to the flowchart of FIG. 6, it is determined, after the step S110, whether the image pickup elements constituting the image sensor 34 have detected the shadow of the leading edge of the original sheet at different timings (step S112). In the negative case, it is assumed that the original sheet is not tilted and the process advances to the step S120. In the affirmative case, it is assumed that the original sheet is tilted, and a skew angle (tilt angle) of the original sheet is calculated on the basis of the difference in timing, and it is determined whether the skew angle thus calculated is within a predetermined permissible range (step S114). FIGS. 7A and 7B are plan views for explaining the skew angle. As shown therein, in the case where the original sheet passes in a straight manner over the image sensor 34 without being tilted, the shadow of the leading edge of the original sheet is detected by all of the image pickup elements of the image sensor 34 at the same timing (see FIG. 7A). Here, the hatched image pickup elements in FIG. 7 represent those that have detected the shadow, and the blank ones represent those that have not done so. On the other hand, in the case where the original sheet is tilted when passing over the image sensor 34, the timings that the image pickup elements of the image sensor 34 each detect the shadow of the leading edge of the original sheet deviate from each other (see FIG. 7B). However, since the transport speed of the original sheet is known, the skew angle can be calculated according to the deviation in timing, in other words time difference. In the case where the skew angle is determined to be within the permissible range at the step S114, the process advances to the step S120, but in the negative case the scanner 10 announces an error alert to the operator (step S116), and the current routine is finished. The error alert may be announced by outputting an audible warning through a speaker (not shown), or by displaying an error message on a display screen (not shown). The flowchart shown in FIG. 6 thus arranged enables accurate determination as to whether the original sheet is tilted, and execution of an appropriate process in accordance with the skew angle. In addition, in the case where the skew angle is determined to be within the permissible range at the step S114, the relevant image data stored in the image memory 48 may be corrected so as to offset the skew angle. As already stated, locating the image sensor 34 farther from the projection screen 36 makes the shadow larger, which provides an additional advantage in that it can be more accurately determined whether the image pickup elements have detected the shadow of the leading edge of the original sheet at different timings.

The flowchart shown in FIG. 6 may be expressed as an independent process excluding the step S120 and thereafter, and the routine may be finished in the negative case at the step S112 or in the affirmative case at the step S114.

Although the image reading apparatus according to the invention is exemplified by the scanner 10 in the foregoing embodiment, the image reading apparatus according to the invention may be applied to an image reading unit of a copy machine, a facsimile machine, or a multifunctional printer. Further, media such as a CD and a DVD may be included as examples of the original sheet, as an object to be read.

The entire disclosure of Japanese Patent Application Nos. 2010-24058, filed Feb. 5, 2010 are expressly incorporated by reference herein.

What is claimed is:

1. An image reading apparatus that reads an image on an original, comprising:
   a transparent plate on which the original is automatically transported;
   a light emitter disposed under the transparent plate that emits light to the original from behind with respect to a transport direction thereof;
   a photodetector that receives reflection of the light;
   a projection plane fixed above the transparent plate at a position spaced apart from the photodetector by a predetermined distance;
   a sensing unit that recognizes through the photodetector a shadow of a leading edge of the original projected on the projection plane, when the leading edge of the original being automatically transported on the transparent plate is illuminated with the light from the light emitter; and
   an original presser that presses the original being automatically transported on the transparent plate, the original presser being located above the transparent plate on a same side of the transparent plate as the projection plane, and the original presser being located between the projection plane and the transparent plate.

2. The image reading apparatus according to claim 1, wherein the projection plane is white.

3. The image reading apparatus according to claim 1, further comprising:
   a transparent original presser that presses the original being automatically transported on the transparent plate, the transparent original presser being located between the projection plane and the transparent plate.

4. The image reading apparatus according to claim 1, further comprising:
   an original position determination unit that determines that the original has reached the reading position, when the original has been automatically transported by a predetermined distance after the shadow of the leading edge of the original is recognized by the sensing unit.

5. The image reading apparatus according to claim 1, wherein the photodetector includes a plurality of light receiving elements aligned in a direction intersecting with the transport direction of the original; the image reading apparatus further comprising an original tilt determination unit that determines whether the original is tilted, on the basis of whether the light receiving elements of the photodetector have detected the shadow of the leading edge of the original at different timings.

* * * * *